(12) United States Patent
Worden et al.

(10) Patent No.: US 11,791,766 B2
(45) Date of Patent: Oct. 17, 2023

(54) MOUNTING ASSEMBLY FOR MOUNTING A PHOTOVOLTAIC MODULE

(71) Applicant: Gamechange Solar Corp., Norwalk, CT (US)

(72) Inventors: Andrew Barron Worden, Redding, CT (US); Woo Kim, Little Neck, NY (US); Scott Van Pelt, Tarrytown, NY (US)

(73) Assignee: Gamechange Solar Corp., Norwalk, CT (US)

( * ) Notice: Subject to any disclaimer, the term of this patent is extended or adjusted under 35 U.S.C. 154(b) by 0 days.

(21) Appl. No.: 17/460,975

(22) Filed: Aug. 30, 2021

(65) Prior Publication Data

US 2022/0190778 A1 Jun. 16, 2022

Related U.S. Application Data

(60) Provisional application No. 63/071,816, filed on Aug. 28, 2020.

(51) Int. Cl.
| F16M 13/00 | (2006.01) |
| H02S 30/10 | (2014.01) |
| F16M 13/02 | (2006.01) |

(52) U.S. Cl.
CPC ............. *H02S 30/10* (2014.12); *F16M 13/02* (2013.01)

(58) Field of Classification Search
None
See application file for complete search history.

(56) References Cited

U.S. PATENT DOCUMENTS

| 4,991,368 | A * | 2/1991 | Amstutz | E04B 2/821 |
| | | | | 52/717.06 |
| 9,825,581 | B2 * | 11/2017 | Wildes | F24S 25/61 |
| 10,461,682 | B2 * | 10/2019 | Schuit | F24S 25/636 |
| 10,511,255 | B2 * | 12/2019 | Prat | H02S 20/32 |
| 10,749,459 | B1 * | 8/2020 | Liu | F16B 5/0685 |
| 2004/0115004 | A1 * | 6/2004 | Serrano | H02G 1/06 |
| | | | | 405/176 |
| 2017/0194896 | A1 * | 7/2017 | Martin | F16B 2/065 |
| 2020/0313603 | A1 * | 10/2020 | Uppu | F24S 25/636 |
| 2022/0060143 | A1 * | 2/2022 | Neal | H02S 30/00 |

* cited by examiner

*Primary Examiner* — Steven M Marsh
(74) *Attorney, Agent, or Firm* — O'Shea P.C.

(57) ABSTRACT

A mounting assembly comprises a reinforcement channel configured to nest around a first base of a first hat-shaped channel wherein the first hat-shaped channel is configured to nest around a second base of a second hat-shaped channel and the second hat-shaped channel is configured to nest around a load distributing channel. The mounting base, the reinforcement channel, the first hat-shaped channel, the second hat-shaped channel and the load distributing channel are configured to be removable with respect to a fastener along the fastener axis. The fastener is received through coaxial apertures located within the mounting base, the reinforcement channel, the first hat-shaped channel, the second hat-shaped channel and the load distributing channel. The channels are of a certain length that is sufficient to add stiffness to an object being supported by the mounting assembly.

11 Claims, 9 Drawing Sheets

MOUNTING ASSEMBLY FOR MOUNTING A PHOTOVOLTAIC MODULE

CROSS REFERENCE TO RELATED APPLICATIONS

This application claims the benefit of U.S. Provisional Patent Application Ser. No. 63/071,816 filed Aug. 28, 2020, which is hereby incorporated by reference.

BACKGROUND OF THE INVENTION

1. Technical Field

This disclosure relates generally to a solar panel installation and, more particularly, to apparatuses and assemblies for use in a solar panel installation.

2. Background Information

Common types of mounting assemblies currently in widespread use comprise a rotating or stationary member that runs the length of a structure, for example a row tube or torque tube and smaller members, for example rails or purlins, which are installed perpendicular to the rotating member. Installation of the smaller members is often accomplished with a U-bolt and two nuts. Photovoltaic (PV) module frames are mounted to the smaller members using four bolts and four nuts for each photovoltaic module. Such mounting assemblies have been deemed appropriate for many uses, but they are not sufficiently fast to install, they are costly, cumbersome to assemble and commonly require other operations for appropriate and safe mounting of photovoltaic modules.

A recent trend in the PV solar market is for solar modules to grow larger in size (i.e., length and width). This allows for several economies of scale for the PV module manufacturer and therefore a cheaper price for the PV module per unit of energy produced. However, this increase in size has in many cases resulted in the modules deflecting more under the same mechanical loading. As the deflected PV module may come into contact with the mounting structure behind it when mechanically loaded, minimizing the amount the middle of the PV module deflects has become a potential failure mode that must be addressed.

Ideally, the deflection of the PV module shall be such that at the middle of the PV module, the glass surface PV module does not move below the bottom of the PV module frame when the design pressure is applied to the top of the PV module surface in the downward orientation.

PV module frames are designed for relatively low cost, and they are inherently not stiff. Thus, under a uniform pressure the ends (relative to the long direction) of the PV module will deflect significantly. As the glass surface of the PV module is flexible (i.e., not rigid), the deflection of the middle of the glass surface of the PV module is a function of both this long side deflection and the short side deflection. From mechanics of materials, idealizing the glass surface of the PV module as a simply supported beam supported on either long side of the module results in the deflection of the middle of the glass surface of the PV module being a function of the width (short side dimension) of the PV module raised to the 4th power. Idealizing the glass surface of the PV module as two cantilevers supported at the middle of the long side of the module, the deflection of the ends of the long side of the module are a function of the length raised to the 4th power. Given that the deflection of the middle of the glass surface of the PV module is a function of both the length and the width of the PV module raised to the 4th power, it is clear that small increases in the dimensions of the PV module can have a significant impact on the module deflection.

U.S. Patent Application Publication 2016/0190976 discloses a mounting bracket assembly in which a mounting bracket includes a first attachable bracket piece and a second attachable bracket piece, a first fastener, a second fastener, and a third fastener. Each attachable bracket piece has a top member and a bottom member connected to the top member at an angle. The first clamp is attached to the top member of the first attachable bracket piece by the first fastener. The second clamp is attached to the top member of the second attachable bracket piece by a second fastener. The third fastener secures the bottom member of the first attachable bracket piece to the bottom member of the second attachable bracket piece. The mounting bracket defines a beam insertion aperture between the top members and the bottom members. The mounting bracket assembly may include a first integral grounding device located adjacent the top member of the first attachable bracket piece or adjacent the top member of the second attachable bracket piece. The first integral grounding device is configured to electrically bond a frame of an electricity generating device to the mounting bracket assembly. The mounting bracket assembly may further include a second integral grounding device configured to electrically bond a torque tube to the mounting bracket assembly.

U.S. Patent Application Publication 2017/0359017 discloses a snap-on mounting bracket assembly suitable for connecting a mounting rail to a torque tube. The mounting bracket assembly includes an upper clamp piece and a lower clamp piece. The upper clamp piece has a first member defining a tube insertion aperture and an open bottom space, an upper partial fastener. The lower clamp piece has a second member with a lower partial fastener configured to mate with the upper partial fastener such that the lower clamp piece is attachable to the upper clamp piece. In an exemplary embodiment, the lower clamp piece further comprises two opposing support members configured to attach to the mounting rail. Solar tracker assemblies incorporating snap-on open mounting brackets are provided. Methods of mounting framed or unframed solar modules are also described. A mounting rail is attached to an upper clamp piece of a mounting assembly. Then the upper clamp piece is snapped onto a torque tube. A lower clamp piece of the mounting assembly is then attached to the upper clamp piece by mating a lower partial fastener of the lower clamp piece with an upper partial fastener of the upper clamp piece. When the upper and lower clamp pieces are attached, the open bottom space is closed, and the mounting rail is secured to the torque tube.

Existing mounting assemblies have certain disadvantages with respect to their efficacy particularly during expeditious photovoltaic module installation projects. Although different problems pertain to different types of mounting assembly, generally they are too cumbersome to install and expensive to install. In particular, existing mounting assemblies do not provide sufficient stiffness to prevent the PV module from deflecting significantly in the middle of the module.

There is a need for an improved mounting assembly.

SUMMARY OF THE DISCLOSURE

According to an aspect of the present disclosure, a mounting assembly comprises a reinforcement channel configured to nest around a first base of a first hat-shaped channel wherein the first hat-shaped channel is configured to nest around a second base of a second hat-shaped channel and the second hat-shaped channel is configured to nest around a load distributing channel, wherein the mounting base, the reinforcement channel, the first hat-shaped channel, the second hat-shaped channel and the load distributing channel are configured to be removable with respect to a fastener along the fastener axis; the fastener is received through apertures located within the mounting base, the reinforcement channel, the first hat-shaped channel, the second hat-shaped channel and the load distributing channel; wherein the channels are of a certain length that is sufficient to add stiffness to an object being supported by the mounting assembly.

A rim of the second hat-shaped channel may include one or more indentations.

The object being supported may be a photovoltaic (PV) module and the channels are of a length and stiffness sufficient to prevent deflection of the middle of the glass surface of the PV module from moving below the elevation of the bottom of the PV module frame under the rated mechanical load of the PV module.

The deflection may be reduced in several ways. For example, adding a stiffener below the long side of the PV module decreases the length that is allowed to deflect and therefore significantly reduces the deflection at the ends of the long side of the module. In this embodiment the stiffener reduces the cantilever length of the PV module at either end of the long side of the PV module frame. Furthermore, when idealizing the glass surface of the PV module as a beam through the short dimension of the PV module, the end conditions have a pronounced impact on the deflection at the middle of the span. Conventional techniques for supporting a PV module only support the bottom of the PV module frame via bolting. This yields a "simply supported" type connection (i.e., two pins), whereas disclosed embodiments connects to both the top and bottom of the PV module frame. By connecting to both the top and bottom of the frame, the connection is closer to a "fixed" connection and not simply supported.

The length of the mounting assembly may be such that the supported PV module does not extend more than 43% of the overall length of the PV module beyond the mounting assembly in either direction.

According to another aspect of the present disclosure, a mounting assembly comprises a first hat-shaped channel configured to nest around a base of a second hat-shaped channel and the second hat-shaped is channel configured to nest around a load distributing channel, wherein the mounting base, the first hat-shaped channel, the second hat-shaped channel and the load distributing channel, are configured to be removable with respect to a fastener along the fastener axis, and the fastener is received through coaxial apertures located within the mounting base, the first hat-shaped channel, the second hat-shaped channel and the load distributing channel.

A rim of the second hat-shaped channel rim may include one or more indentations.

The foregoing features and the operation of the invention will become more apparent in light of the following description and the accompanying drawings.

DETAILED DESCRIPTION

Figure 1:
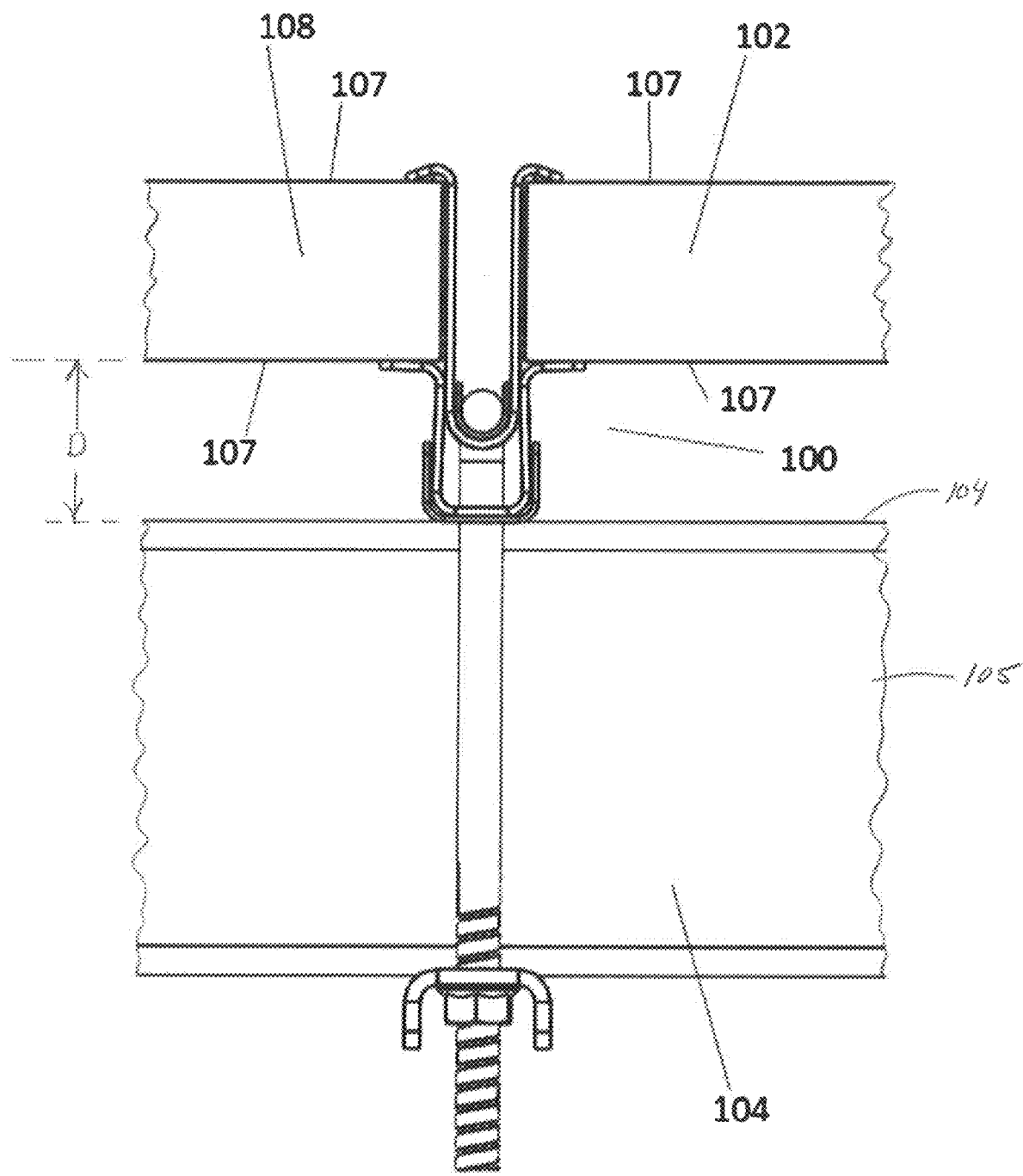
FIG. 1 is a schematic of a preassembly of the mounting clamp from a side view.

Referring to FIG. 1, a mounting assembly 100 can be used for mounting one or more photovoltaic modules 102 to a surface 104 of a structural member 105 such as for example a row tube, torque tube, or other rotating or stationary member. The mounting assembly 100 can support one or more photovoltaic modules 102, such for example, two photovoltaic modules 102. The mounting assembly 100 can support horizontal surfaces 107 of the photovoltaic modules 102, 108. While the illustrated example illustrates a total of two photovoltaic modules (e.g., 102, 108) for ease of illustration, any number of photovoltaic modules are contemplated. The mounting assembly 100 supports the photovoltaic modules 102, 108 a distance away D from the surface 104, such that components and/or structures maybe located between the surface 104 and the photovoltaic modules 102, 108.

Figure 2:
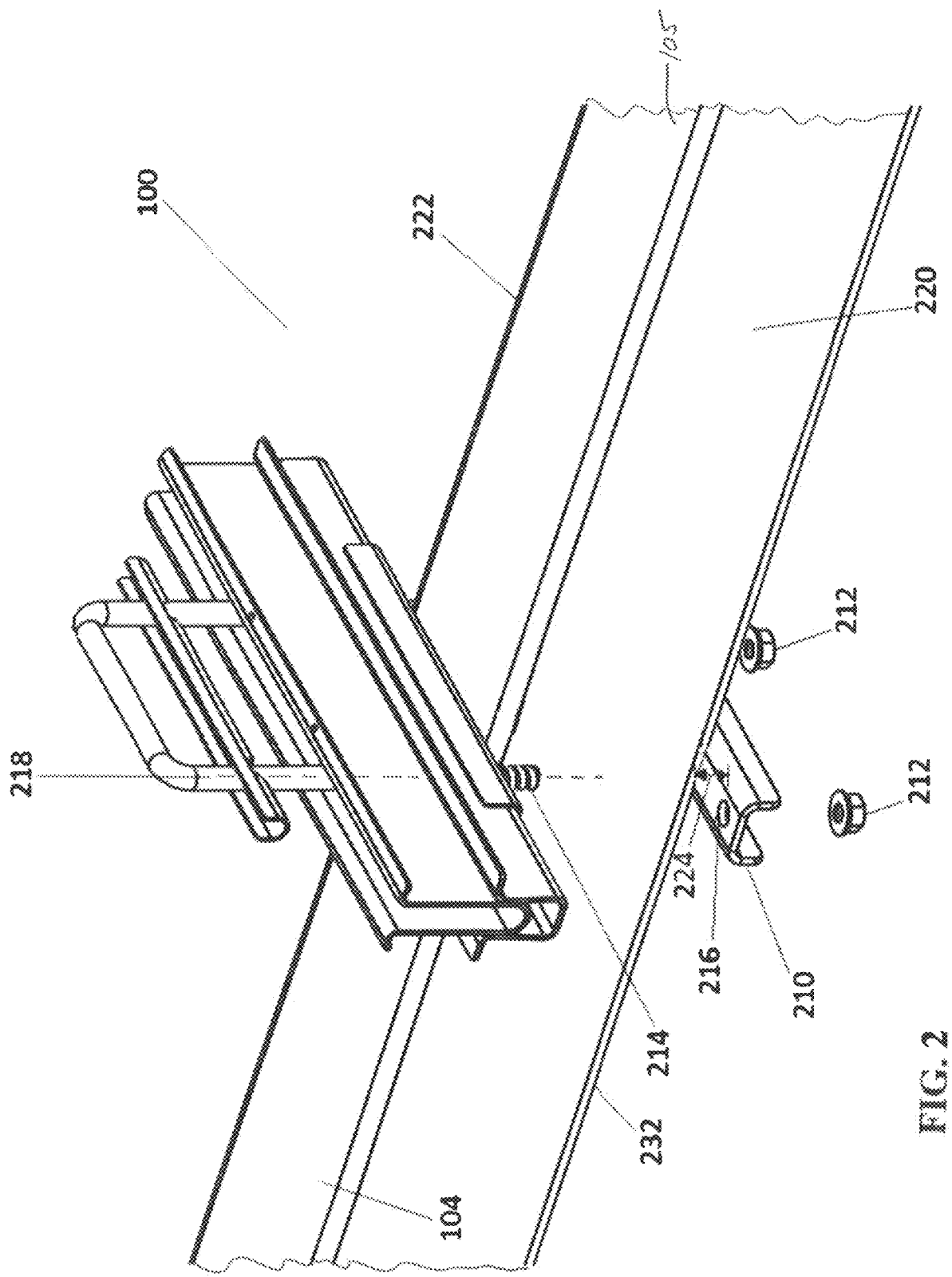
FIG. 2 is a schematic of an exploded view of the mounting clamp top from an isometric view.

FIG. 2 is an exploded view of the mounting assembly 100. The mounting assembly 100 may comprise a mounting base 210 that is used to clamp the mounting assembly 100 to the structural member 105. The mounting base 210 can be used to clamp the mounting assembly 100 to the structural member 105, using for example a threaded fastener (e.g., a bolt or U-bolt 214) and one or more first attachment structure(s) 212. In such an example the first attachment structure 212 (e.g., threaded nut) can attach to the threaded fastener 214, which extends through one or more aperture(s) 216 in the mounting base 210, with the fastener 214 extending on to the side surface 220, 222 and extending below the bottom surface 232 at least partially for attaching the first attachment structure 212.

The first attachment structure/threaded nut 212 can be selectively loosened and/or removed, such that the mounting base 210 can be removed from the surface 104. The mounting base 210 is configured to support the fastener 214, which extends along a fastener axis 218. In an example, the fastener axis 218 may be substantially parallel to a plane within which the side surfaces 220, 222 lie. The fastener axis 218 may likewise be substantially perpendicular to a plane within which the mounting base 210 lies. In an example, the first attachment structure/threaded nut 212 may be supported by the mounting base 210 such that the first attachment structure/threaded nut 212 is substantially inhibited from moving along the fastener axis 218. However, the first attachment structure/threaded nut 212 can move with respect to the mounting base 210 in a direction that is substantially in the same plane as the fastener axis 218. For example, a head of the first attachment structure/threaded but 212 can be positioned within a channel within the mounting base 210, with the first attachment structure/threaded nut 212 being substantially secured within the channel.

In certain embodiments the fastener 214 may be any hardware device that mechanically joins or affixes two or more of the mounting base components together.

Referring still to FIG. 2, the mounting assembly 100 comprises a mounting base 210 configured to be removable with respect to the fastener 214 along the fastener axis 218 when the fastener 214 is received through the mounting base aperture 216. As such, a first distance 224 between a bottom of the surface 232 and a mounting base 210 is adjustable.

Figure 3:
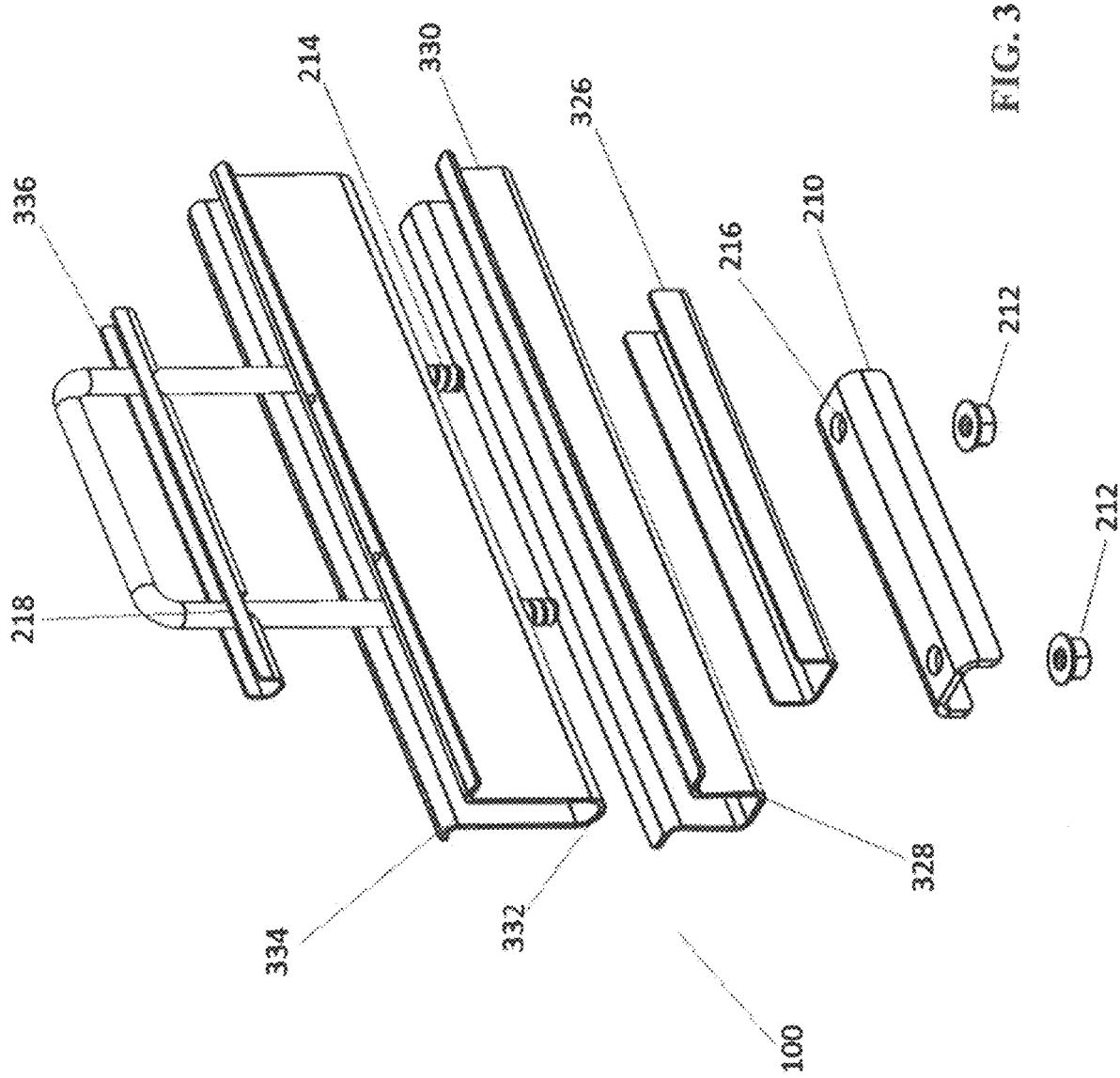
FIG. 3 is a schematic of an exploded view of the mounting clamp from an isometric view.

Referring to FIG. 3, the mounting assembly 100 comprises a reinforcement channel 326 configured to nest around a base 328 of a first hat-shaped channel 330. The first hat-shaped channel 330 is configured to nest around a base 332 of a second hat-shaped channel 334. The second hat-shaped channel 334 is configured to nest around a load distributing channel 336. The mounting assembly 100 comprises the mounting base 210, the reinforcement channel 326, the first hat-shaped channel 330, the second hat-shaped channel 334 and a load distributing channel 336, each component configured to be removable with respect to the fastener 214 along the fastener axis 218. The fastener 214 is received through apertures located within a mounting base 210, the reinforcement channel 326, the first hat-shaped channel 330, the second hat-shaped channel 334 and the load distributing channel 336. While the illustrated example illustrates one U-bolt fastener (e.g., 314), any form and number of fastener(s) is contemplated.

Figure 4:
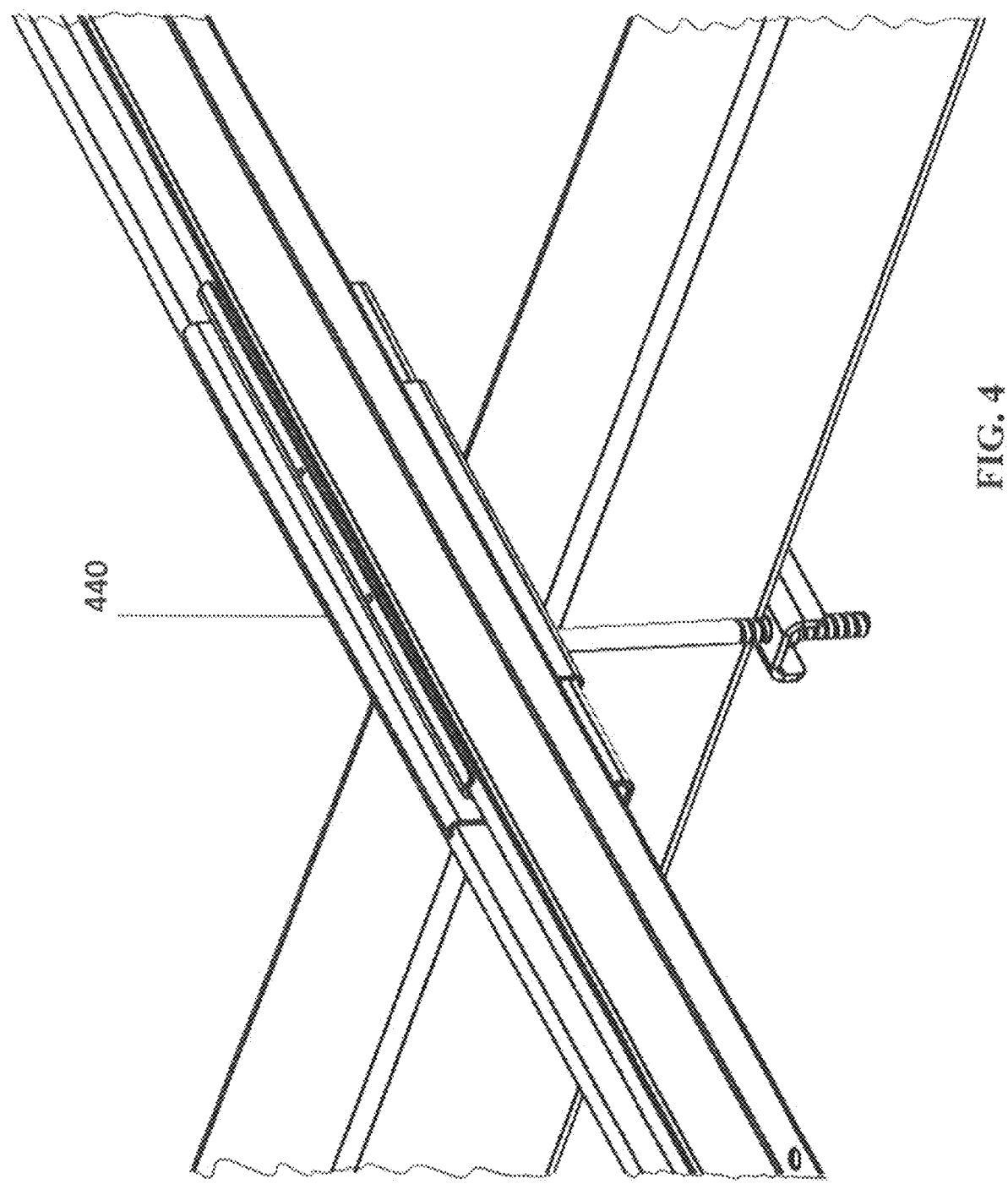
FIG. 4 is a schematic of the mounting clamp from an isometric view.

Referring to FIGS. 3 and 4, the mounting assembly 100 of FIG. 3 can be defined as a mounting clamp 444 when assembled, as shown in of FIG. 4.

Figure 5:
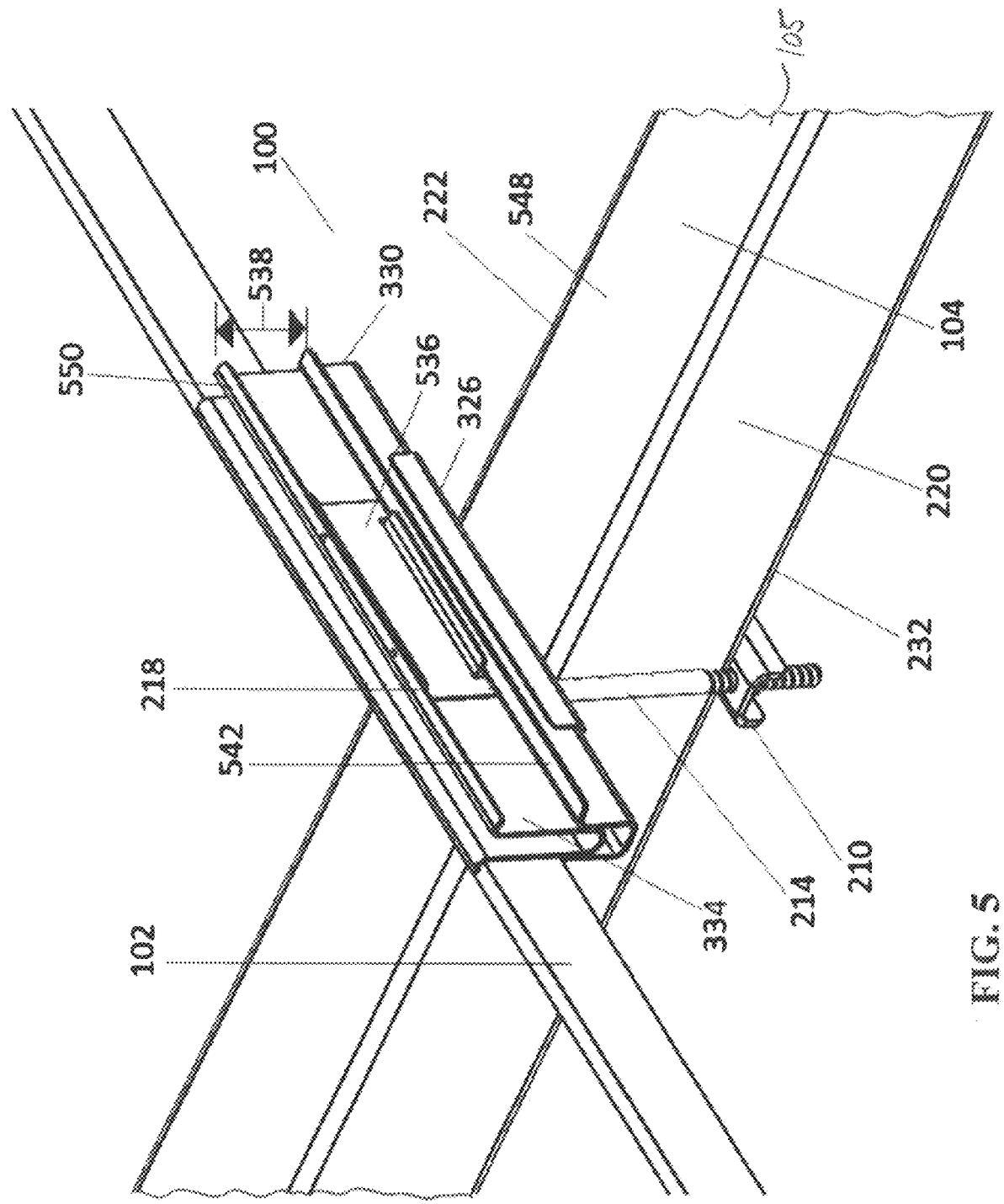
FIG. 5 is a schematic of the mounting clamp with a support plate insert from an isometric view.

Referring to FIG. 5, the reinforcement channel 326 is configured to be coupled to a top surface 548, and it will be appreciated that the reinforcement channel 326 can be attached to and or detached from the top surface 548. The reinforcement channel 326 can be attached to the top surface 548 in any manner of ways such as with the fastener 214 that extends through apertures in the reinforcement channel 326, with the fastener 214 extending on to the side surface(s) 220, 222 and extending below the bottom surface 232 at least partially to extend through apertures in the mounting base 210 to attach the first attachment structure. The first attachment structure/threaded nut 212 (FIGS. 2 and 3) can be selectively loosened and/or removed, such that the mounting base 210 can be removed from the bottom surface 232 and the reinforcement channel 326 can be removed from the top surface 548. The mounting base 210 and the reinforcement channel 326 are configured to support the fastener 214 that extends along a fastener axis 218. In an example, the fastener axis 218 may be substantially perpendicular to a plane within which the side surface 220, 222 lies.

Referring still to FIG. 5, the mounting assembly 100 comprises the second hat-shaped channel 334 configured to be removable with respect to the first hat-shaped channel 330. As such, a second distance 538 between a top rim 550 and a bottom rim 542 of the mounting assembly 100 is adjustable. In this example a photovoltaic module 102 can be mounted between the bottom rim 542 of the mounting assembly 100 and the top rim 550 of the mounting clamp. Due to the second distance 538 being adjustable, the mounting assembly 100 can accommodate different sizes of photovoltaic module 102.

Referring again to FIG. 5, the thickness of the first hat-shaped channel 328 and the second hat-shaped channel 332 may be such that the stiffness of the top rim 550 and bottom rim 542 result in the connection between the mounting assembly and the object being supported acting like a fixed and not simply supported connection.

The length of the first hat-shaped channel 330 and the second hat-shaped channel 334 may be long enough that the PV module does not extend more than 43% of the overall length of the PV module beyond the mounting assembly in either direction.

Referring again to FIG. 5, the mounting assembly 100 comprises the second hat-shaped channel 334 configured at a second distance 538 between the top rim 550 and the bottom rim 542 of the mounting assembly 100 to accommodate a photovoltaic module on each side of the mounting assembly 100. In this example one side of the mounting assembly 100 accommodates a photovoltaic module 102 and the other side of the mounting assembly 100 accommodates a support plate 536 (e.g., an end clamp insert). The support plate 536 is inserted into the opposing side of the mounting assembly 100 between the top rim 550 and the bottom rim 542 of the mounting assembly 100. The support plate 536 provides a path for the load when a mounting assembly 100 is positioned at the end of a surface 104 (e.g., a row tube).

Figure 6:
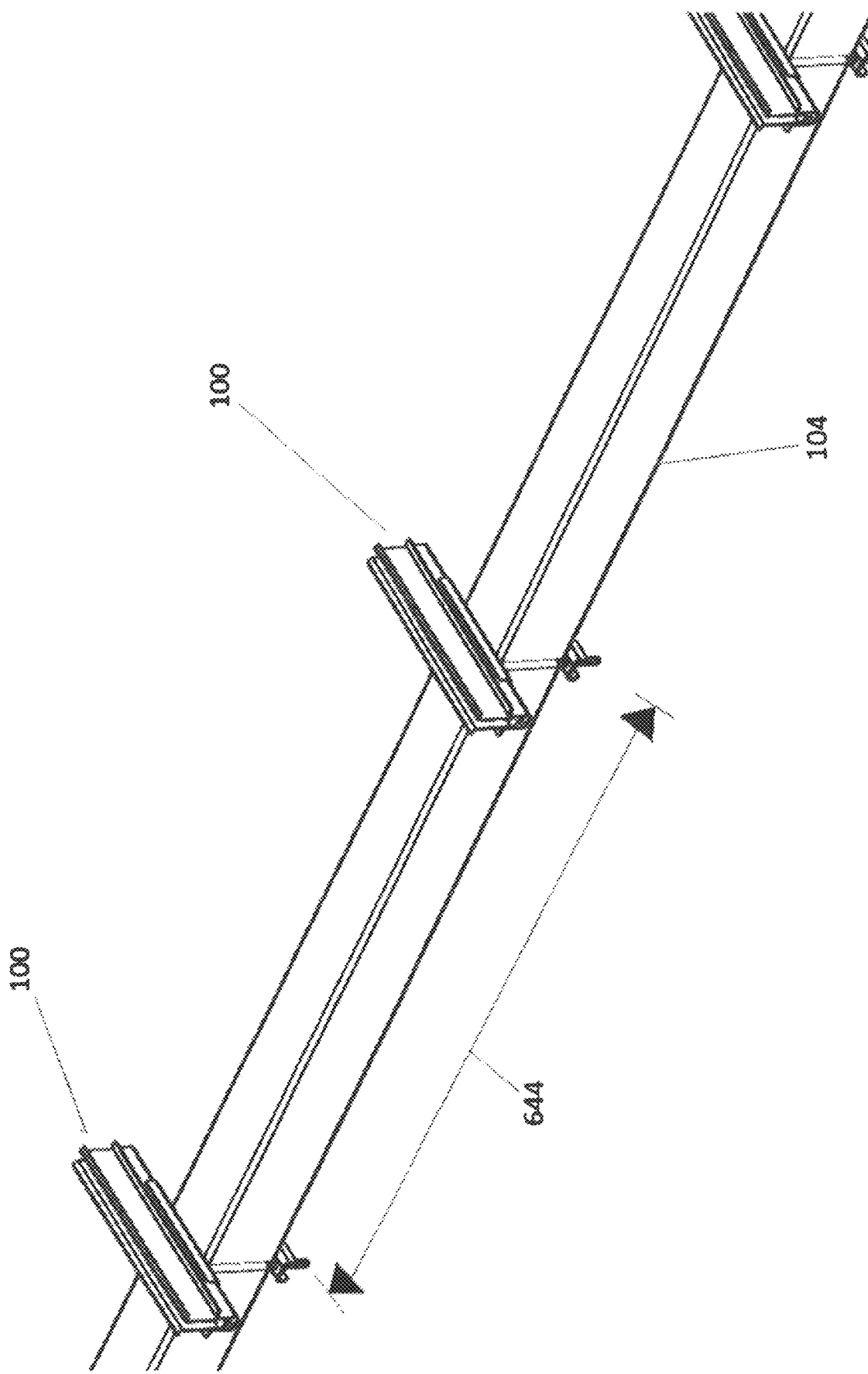
FIG. 6 is a schematic of a plurality of mounting clamps attached to a surface from an isometric view.

Referring to FIG. 6, a plurality or mounting assemblies 100 may be attached to the surface 104. A third distance 644 between mounting assemblies 100 is adjustable, and the mounting assembly 100 can accommodate different sizes of photovoltaic modules and varying numbers of photovoltaic modules depending on the length of the surface 104.

Figure 7:
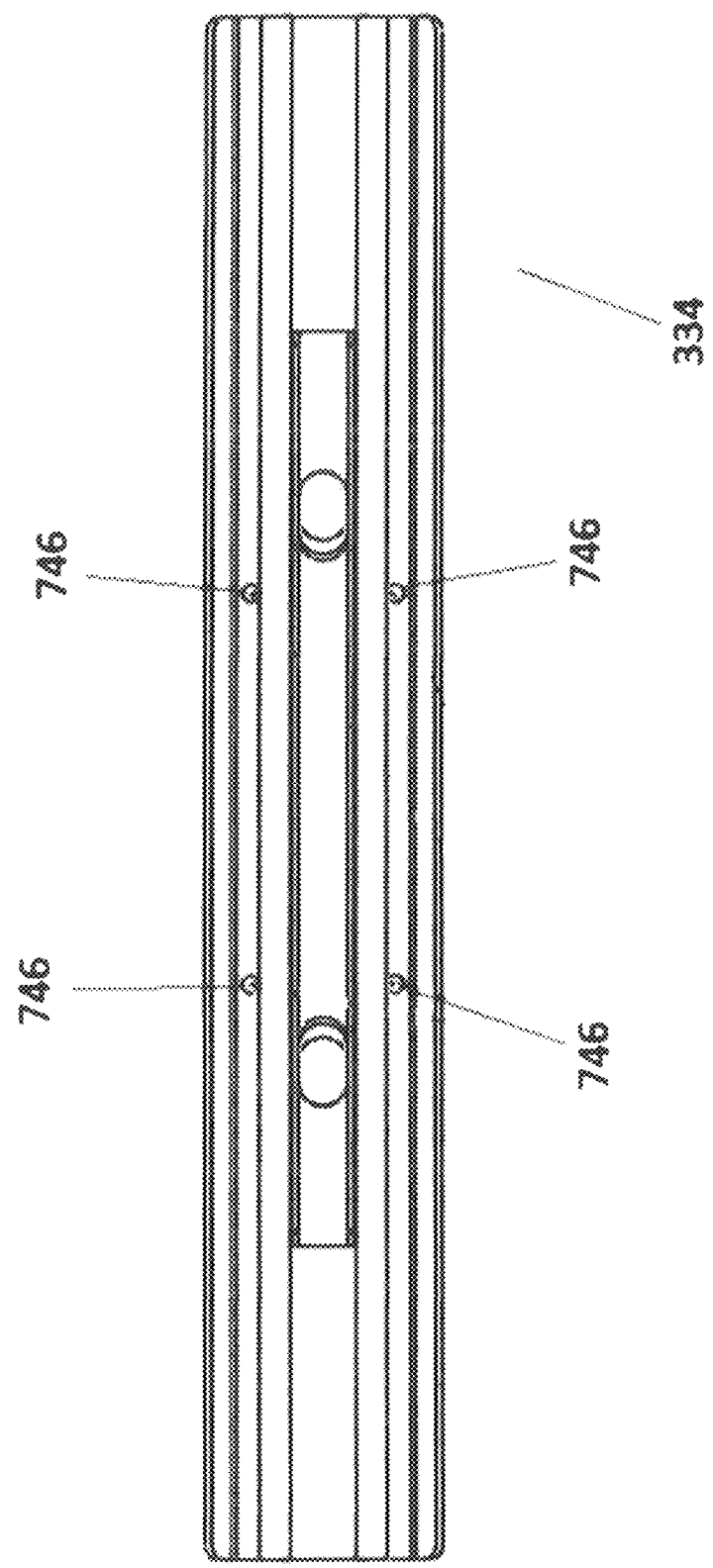
FIG. 7 is a schematic of the mounting clamp from a top view.

Referring to FIG. 7, the second hat-shaped channel 334 is configured with a plurality of indentations 746 (e.g., in this embodiment four), two located on each rim and located in a suitable position to be pierced through to the adonized coating on a photovoltaic module. The second hat-shaped channel 332 may be electronically bonded to the photovoltaic module to electrically ground the photovoltaic module racking structure. It is contemplated that the indentations 746 (e.g., serrated edges) that bite into the frame of the solar panel frame to establish a grounding path may also be located on the first hat shaped channel 330.

Figure 8:
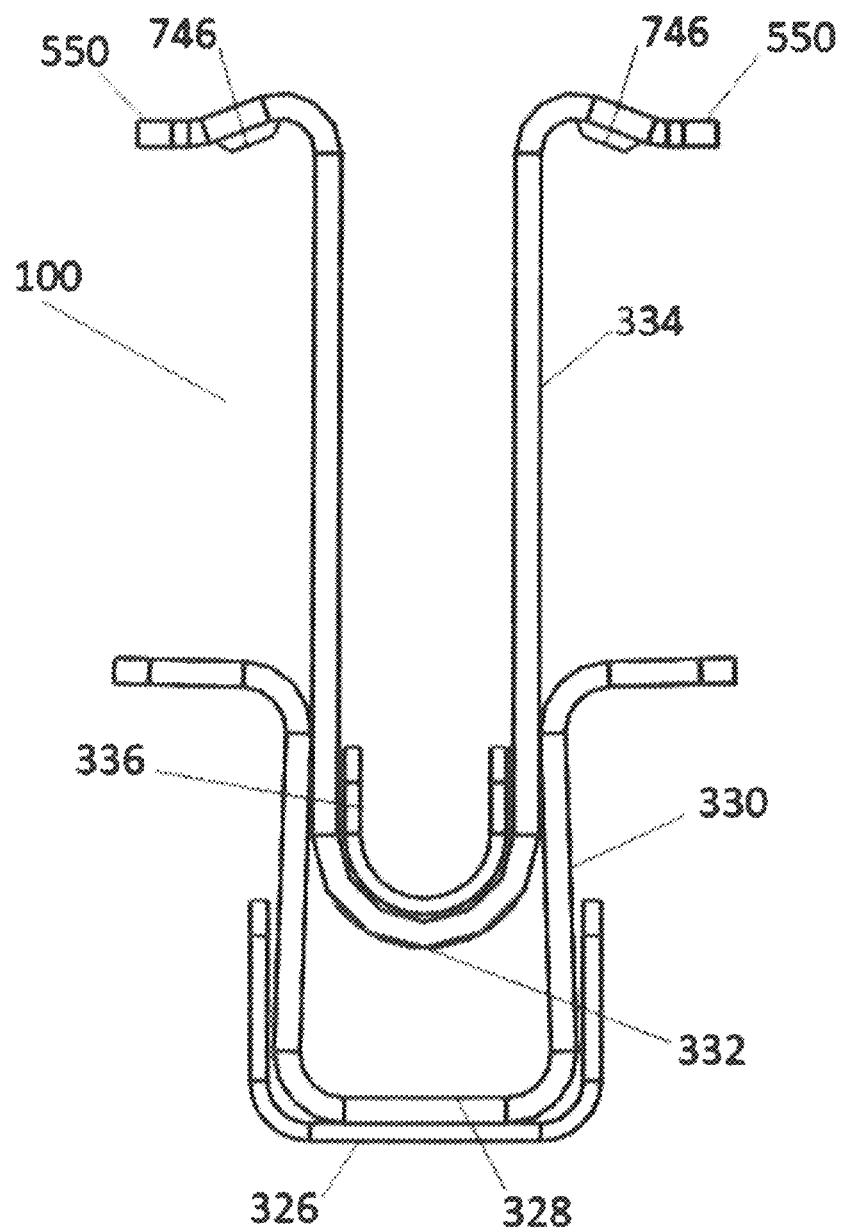
FIG. 8 is a schematic of the mounting clamp from a cross section view.

Referring to FIG. 8, the mounting assembly 100 may comprise a reinforcement channel 326 configured to nest around the base 328 of the first hat-shaped channel 330. The first hat-shaped channel 330 is configured to nest around the base 332 of the second hat-shaped channel 334. The second hat-shaped channel 334 is configured to nest around the load distributing channel 336. The rims 550 on each side of the second hat-shaped channel 334 are configured with one or more indentations 746.

Figure 9:
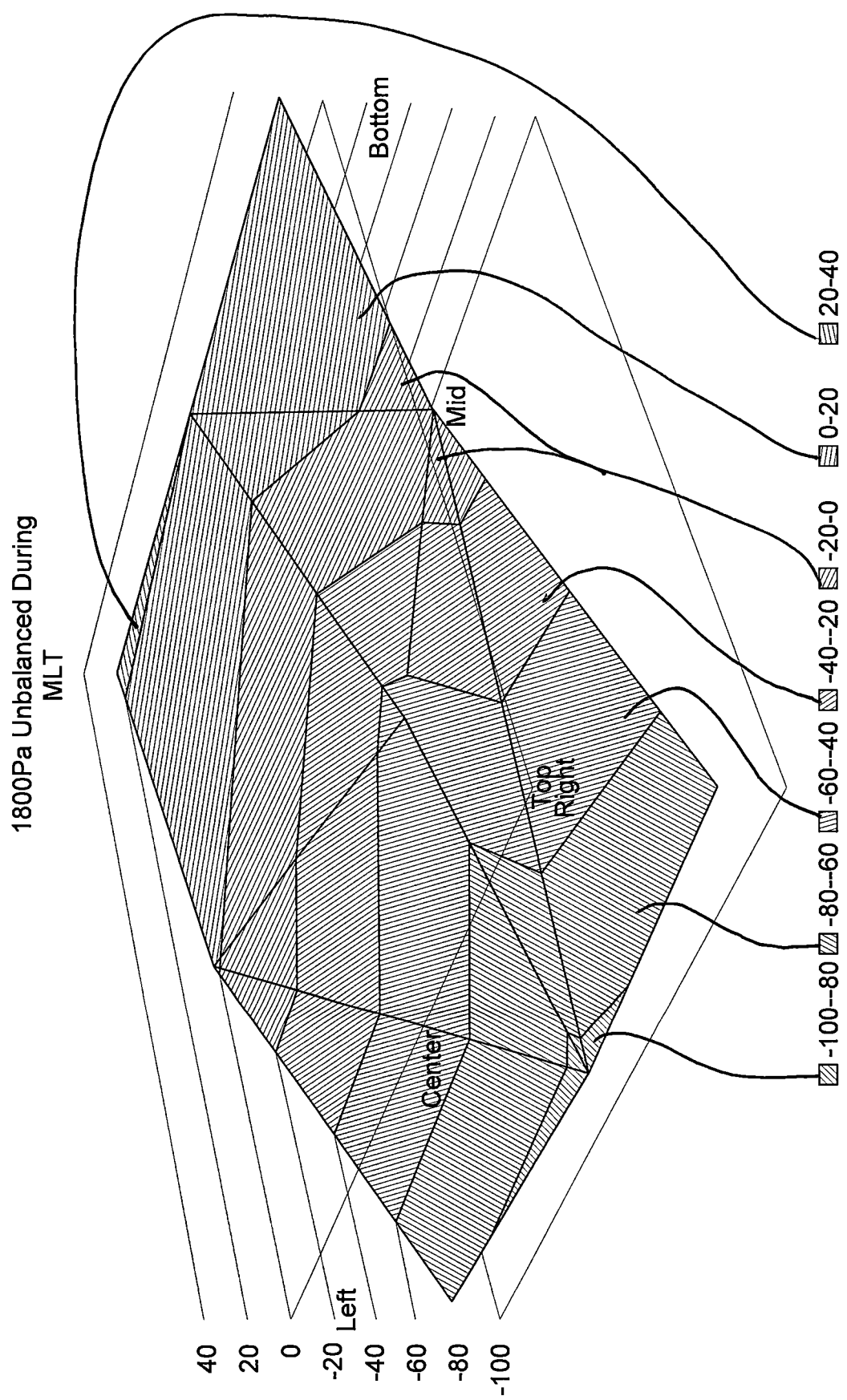
FIG. 9 is a sample heat map of module deflection under mechanical load.

Referring to FIG. 9, deflection of the photovoltaic modules under load can be of significant concern. FIG. 9 illustrates a sample heat map of deflections (measured in mm) of a solar module under a uniform 1800 Pa mechanical load.

The rim of the second hat-shaped channel may have no, one or more indentations located anywhere along the rim. In one embodiment, the rim of the second hat-shaped channel is configured with a plurality (i.e., two or more) indentations, located between the two apertures.

The mounting assembly may comprise a reinforcement channel, which may vary in length or height, configured to nest around the base of a first hat-shaped channel which may vary in length or height. The first hat-shaped channel is configured to nest around the base of a second hat-shaped channel which may vary in length or height. The second hat-shaped channel is configured to nest around a load distributing channel, which may vary in length or height.

The mounting assembly may comprise a first hat-shaped channel. The first hat-shaped channel is configured to nest around the base of a second hat-shaped channel. The first hat-shaped channel can be attached to and or detached from a top surface, the top surface may be the top surface of a row tube for example, in any manner of ways such as with a fastener that extends through apertures in the first hat-shaped channel and the second hat-shaped channel, with the fastener extending on to a side surface(s), the side surface may be the side surface of a row tube for example, and extending below a bottom surface, the bottom surface may be the bottom surface of a row tube for example, at least partially to extend through apertures in a mounting base to provide a means for attaching the first attachment structure. The first attachment structure can be selectively loosened and/or removed, such that the mounting base can be removed from the bottom surface and the reinforcement channel can be removed from the top surface.

In one embodiment the mounting assembly may comprise a mounting base, a reinforcement channel, a first hat-shaped channel, a second hat-shaped channel and a load distribution channel nested and/or attached in any order. For example, the first hat-shaped channel maybe interchanged with the second hat-shaped channel.

The mounting assembly may comprise a solid structure with at least one rim in replacement of the second hat-shaped structure.

Although the subject matter has been described in language specific to structural features or methodological acts, it is to be understood that the subject matter defined in the appended claims is not necessarily limited to the specific features and acts described above. Rather, the specific features and acts described above are disclosed as example forms of implementing at least one of the claims.

Various operations of embodiments are provided herein. The order in which some or all of the operations described should not be construed to imply that these operations are necessarily order dependent. Alternatively ordering will be appreciated having the benefit of this description. Further it will be understood that not all operations are necessarily present in each embodiment provided herein. Also it will be understood that not all operations are necessary in some embodiments.

Many modifications may be made to the current invention without departing from the scope or spirit of the claimed subject matter. Unless specified otherwise, "first," "second," or the like are not intended to imply a temporal aspect, a spatial aspect, an ordering etc. Rather such terms are merely used as identifiers names etc. for features, elements, items etc. for features, elements, items, etc. For example, a first location and a second location correspond to location A and location B or two different or two identical locations or the same location.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are to be construed to mean "one or more" unless specified otherwise or clear from context to be directed to a singular form. Also, at least one of A and B or the like means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alternations and modifications will occur to others skilled in the art based upon reading and understanding of this specification and the annexed drawings. The disclosure includes all such modifications and alterations and is limited only by the scope of the following claims. In particular regard to the various functions performed by the above-described components (e.g., elements, resources, etc.), the terms used to describe the components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one or several implementations, such feature may be combined with one or more other features of the other implementations as may be desired and advantageous for any given or particular application.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A mounting assembly, comprising:
   a reinforcement channel nested about a first base of a first hat-shaped channel wherein the first hat-shaped channel is nested about a second base of a second hat-shaped channel and the second hat-shaped channel is nested about a load distributing channel, wherein a mounting base, the reinforcement channel, the first hat-shaped channel, the second hat-shaped channel and the load distributing channel, are removable with respect to a fastener along a fastener axis;
   wherein the fastener is received through apertures located within the mounting base, the reinforcement channel, the first hat-shaped channel, the second hat-shaped channel and the load distributing channel; and
   wherein the first and second hat-shaped channels are of a certain length that is sufficient to add stiffness to an object being supported by the mounting assembly.

2. The mounting assembly of claim 1, wherein the second hat-shaped channel comprises a rim that includes one or more indentations.

3. A mounting assembly, comprising:
   a first hat-shaped channel nested about a base of a second hat-shaped channel and the second hat-shaped channel is nested about a load distributing channel, wherein a mounting base, the first hat-shaped channel, the second hat-shaped channel and the load distributing channel, are removable with respect to a fastener along a fastener axis; and
   wherein the fastener is received along the fastener axis through coaxial apertures located within the mounting base, the first hat-shaped channel, the second hat-shaped channel and the load distributing channel.

4. The mounting assembly of claim 3, wherein the second hat-shaped channel comprises a rim that includes one or more indentations.

5. The mounting assembly of claim 1, where the object being supported is a photovoltaic module and the first and second hat-shaped channels are of a length and stiffness sufficient to prevent deflection of a mid-section of a glass surface of the photovoltaic module from moving below a bottom elevation of the photovoltaic module under a rated mechanical load of the photovoltaic module.

6. The mounting assembly of claim 1, where the object being supported is a photovoltaic module and the first and second hat-shaped channels are of a length and stiffness sufficient to prevent deflection of a mid-section of a glass surface of the photovoltaic module from moving below a bottom elevation of a base surface of the first hat-shaped channel.

7. The mounting assembly of claim 1, where the object is a photovoltaic module and the mounting assembly has a mounting assembly length such that the photovoltaic module does not extend more than 43% of the overall length of the photovoltaic module beyond the mounting assembly in either direction.

8. The mounting assembly of claim 1, wherein the first hat-shaped channel comprises a rim that includes one or more indentations.

9. The mounting assembly of claim 3, wherein the first hat-shaped channel comprises a rim that includes one or more indentations.

10. The mounting assembly of claim 1, where the object is a photovoltaic module and the mounting assembly has a length such that not more than 43% of overall length of the photovoltaic module extends beyond the mounting assembly in either lengthwise direction.

11. The mounting assembly of claim 1, the object is a photovoltaic module where the mounting assembly has a length such that not more than about 900 mm of the photovoltaic module in a lengthwise direction extends beyond the mounting assembly on either lengthwise side of the mounting assembly.

* * * * *